(12) United States Patent
MacDermot (10) Patent No.: US 12,375,318 B2
(45) Date of Patent: *Jul. 29, 2025

(54) METHOD AND DEVICE FOR CONTROLLING A SMART DEVICE

(71) Applicant: Inter IKEA Systems B.V., LN Delft (NL)

(72) Inventor: Samuel MacDermot, Salford (GB)

(73) Assignee: Inter IKEA Systems B.V., LN Delft (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/583,751

(22) Filed: Feb. 21, 2024

(65) Prior Publication Data

US 2024/0195653 A1  Jun. 13, 2024

Related U.S. Application Data

(63) Continuation of application No. 17/724,957, filed on Apr. 20, 2022, now Pat. No. 11,949,534.

(30) Foreign Application Priority Data

Apr. 28, 2021 (EP) .................................... 21170903

(51) Int. Cl.
*H04L 12/28* (2006.01)
*G06F 3/01* (2006.01)
*G06V 20/00* (2022.01)

(52) U.S. Cl.
CPC ............ *H04L 12/282* (2013.01); *G06F 3/011* (2013.01); *G06F 3/017* (2013.01);
(Continued)

(58) Field of Classification Search
CPC ............... H04L 12/282; H04L 12/2814; H04L 12/2829; H04L 2012/28; H04L 2012/285;
(Continued)

(56) References Cited

U.S. PATENT DOCUMENTS

2016/0191836 A1   6/2016  Weng et al.
2018/0018508 A1   1/2018  Tusch
(Continued)

FOREIGN PATENT DOCUMENTS

WO   2021174889 A1   9/2021

OTHER PUBLICATIONS

Author: Li et al. Title: "Study on Object Operating System for Service Robot Based on Artificial Marks" Publisher: IEEE (Year: 2007).*

(Continued)

*Primary Examiner* — Kamal M Hossain
(74) *Attorney, Agent, or Firm* — Merchant & Gould P.C.

(57) ABSTRACT

A method for controlling a smart device is provided. The method comprises identifying a user-furniture interaction activity of a user interacting with a home furnishing product by analyzing sensor data, captured by an imaging sensor, depicting a scene of the user interacting with the home furnishing product. The method further comprises comparing the user-furniture interaction activity against a set of predetermined user-furniture interaction activities, thereby determining a specific predetermined user-furniture interaction activity among the set of predetermined user-furniture interaction activities, wherein each of the predetermined user-furniture interaction activities is associated with a rule of controlling a smart device. The method further comprises controlling the smart device in accordance with the rule.

11 Claims, 3 Drawing Sheets

(52) U.S. Cl.
 CPC ...... *H04L 12/2814* (2013.01); *H04L 12/2829* (2013.01); *H04L 2012/285* (2013.01)

(58) Field of Classification Search
 CPC ... G06F 3/011; G06F 3/017; G06V 2201/033; G06V 20/36; G06V 40/20
 See application file for complete search history.

(56) References Cited

U.S. PATENT DOCUMENTS

2018/0285653 A1* 10/2018 Li ........................ G08B 25/08
2018/0288161 A1* 10/2018 Saxena ................. H04W 4/33
2019/0064929 A1*  2/2019 Tomeh ................. H04L 67/535
2019/0349213 A1* 11/2019 Shive ................... G05B 15/02

OTHER PUBLICATIONS

Extended European Search Report for EP Application No. 21170903.5 mailed Oct. 18, 2021 (7 pages).
Li, et al., "Study on Object Operating System for Service Robot Based on Artificial Marks", IEEE, 2007.
Leonidis, et al., "Ambient Intelligence in the Living Room", Sensors, 2019, MDPI, doi: 10.3390/s19225011.
Lee, et al., "Embedded System for Camera-Based TV Power Reduction", IEEE, 2011, DOI 10.1109/DSD.2011.101.

* cited by examiner

METHOD AND DEVICE FOR CONTROLLING A SMART DEVICE

CROSS-REFERENCE TO RELATED APPLICATION(S)

This application is a continuation of U.S. application Ser. No. 17/724,957, filed on Apr. 20, 2022, which claims priority to European Patent Application No. 21170903.5 filed on Apr. 28, 2021, the disclosure of which is hereby incorporated by reference in its entirety. To the extent appropriate, a claim of priority is made to the above-disclosed application.

FIELD OF TECHNOLOGY

The present disclosure belongs to methods and devices for controlling a smart device.

BACKGROUND

The number of Internet of Things, IoT, connected devices presently increases at an exponential rate, expected to be doubled within five years from now. As IoT devices include not only vehicles, buildings and machines, but also household items, clothes or other accessories, domestic homes are now widely transformed to be controlled and/or regulated by sensors, by smartphone applications, or the like. Controlling household items may not only enhance user convenience but may also serve as aids within home health care to anticipate/prevent falls, or the like.

Home furnishing products having built-in smart features such that being capable of communicating with other smart devices are known in the art. By way of example, an office chair may detect, using a built-in pressure sensor, whether a person sits on its chair seat. Such a detection may trigger a desk lamp to be automatically turned on to facilitate convenience for a user. Another example can be a person who sits down on a sofa and touches a built-in touch sensor, which may subsequently trigger a TV to be automatically turned on and/or automatically dimming a ceiling lamp.

The above and other examples require built-in sensors in the considered pieces of furniture. It goes without saying that such a so-called smartification of a home may eventually require a large number of such sensors. Further, retro-fitting such sensors into/onto home furnishing products may occasionally be a non-trivial task, and may further cause damage on the home furnishing product.

Hence, there is a need for an improved approach to conveniently smartify non-smart home furnishing products.

SUMMARY

Thus, some embodiments of the present disclosure provide an approach for smartifying home furnishing products.

According to a first aspect, there is provided a computer implemented method for controlling a smart device. The method comprises
  identifying a user-furniture interaction activity of a user interacting with a home furnishing product by analyzing sensor data, captured by an imaging sensor, depicting a scene of the user interacting with the home furnishing product,
  comparing the user-furniture interaction activity against a set of predetermined user-furniture interaction activities, thereby determining a specific predetermined user-furniture interaction activity among the set of predetermined user-furniture interaction activities, wherein each of the predetermined user-furniture interaction activities is associated with a rule of controlling a smart device, and
  controlling the smart device in accordance with the rule.

Sensor data refers to data captured by the imaging sensor, such as image data, IR-data, radar data, etc. That is, sensor data refers to all kind of data that may be used to give information about objects being present in the scene of the user interacting with the home furnishing product. The imaging sensor may be an ordinary sensor of a video camera, the sensor data thereby being an image(s) or a video stream of the scene of the user interacting with the home furnishing product. Alternatively, or in combination, the imaging sensor may be based on any 3D-scanning technology, e.g. utilizing a millimeter wave radar (mmWave), time-of-flight laser, a light detection and ranging (LIDAR) laser, a conoscopic-holography based method, a phase-shift based method, a triangulation-based method, or the like. In other words, the imaging sensor may be any sensor capturing image data within specific wavelength ranges across the electromagnetic spectrum, including light from frequencies beyond the visible light range (400-700 nm) such as infrared or frequencies used by any radar technology.

The user may be a human, an animal, or a robot.

A home furnishing product may be a sofa, a bookcase, a cabinet, a lamp, a curtain, a carpet, a chair, a table, or the like. Hence, any piece of furniture or furnishing product is included in the set of home furnishing products.

A smart device is generally, and also herein, understood to be an electronic device, generally connected to other devices or networks via different wireless protocols such as Bluetooth, Zigbee, Thread, NFC, Wi-Fi, LiFi, 5G, etc., that can operate, at least to some extent, interactively and autonomously.

Above and below the transitive verb "smartify" is used. By "smartifying" a specific product, e.g., as herein, a home furnishing product, or "smartification" of the specific product, refers to enabling a product-user interaction between the specific product and the user for controlling a smart device, where no additional technology specifically tied to that specific product is needed.

The method thus allows a user to interact with an otherwise non-connected home furnishing product for controlling a smart device, without retrofitting a sensor or remote or the like to the home furnishing product. Hence, the method facilitates a convenient smartification of a home furnishing product, having a minimal aesthetic and/or economic impact on the home furnishing product.

The method may further comprise
  identifying the user as a specific user, and
  selecting the set of predetermined user-furniture interaction activities based on the identified specific user.

The identification of the user as a specific user may allow customization of the method to a specific user. Hence, the method may account for individual preferences regarding the rule of controlling the smart device.

The method may further comprise
  identifying the home furnishing product as a specific home furnishing product, and
  selecting the set of predetermined user-furniture interaction activities based on the identified specific home furnishing product.

The identification of a home furnishing product may include any object detection algorithm, image recognition algorithm, or the like. Similar user-furniture interactions may thereby be used for different home furnishing products. This may save computer power and time.

The identification of the home furnishing product as a specific home furnishing product may comprise at least one of: comparing characteristics of the home furnishing product against a database of characteristics of home furnishing products and reading an optically readable code on the home furnishing product.

The characteristics may be found by an object detection algorithm. The object detection algorithm may comprise image segmentation. The comparison of the characteristics of the home furnishing product against a database of characteristics of home furnishing products may be performed by using a trained neural network, NN. The database may be a library of images. The optically readable code may be a QR-code, a bar-code, etc. Any of these actions may allow a fast and precise identification of the home furnishing product.

The method may further comprise identifying a functional role of the home furnishing product and selecting the set of predetermined user-furniture interaction activities based on the identified functional role of the home furnishing product.

A functional role of a home furnishing product may by way of example be a home furnishing product to be used for sitting. For instance, a chair and a sofa may share the functional role of "sitting". In this example, only predetermined user-furniture interaction activities including that the user "sits" may be used for comparing with the current user-furniture interaction activity of the user. Hence, this may allow for increased computational efficiency as well as reduced memory and/or storage requirements of the method. Hence, different home furnishing products may have similar functional roles. Further, a specific user-furniture interaction activity may trigger different smart-device functions if done in pieces of furniture having different functional roles.

The identification of the functional role of the home furnishing product may comprise at least one of: comparing characteristics of the home furnishing product against a database of characteristics of home furnishing products and reading an optically readable code on the home furnishing product.

As discussed above, the optically readable code may be a QR-code, a bar-code, etc. The characteristics may be found by an object detection algorithm. The object detection algorithm may comprise image segmentation. The comparison of the characteristics of the home furnishing product against a database of characteristics of home furnishing products may be performed by using a trained neural network, NN. The database may be a library of images. Any of these actions may allow a fast and precise identification of the home furnishing product.

The user-furniture interaction activity may comprise a change of position of a body part of the user in relation to the home furnishing product.

Such a change of position of a body part of the user may include an arm resting on an armrest, the user standing up or sitting down, etc.

The user-furniture interaction may comprise one or more of a head motion, an arm motion, and a leg motion. For example, if the user turns his/hers head while interacting with a specific furnishing, this may result is a specified action of any of the smart devices that can be controlled. This embodiment further increases the flexibility of the method.

The user-furniture interaction activity may comprise an interaction of a specific body part of the user with a specific portion of the home furnishing product. By way of example, this may include resting an arm or hand on an armrest, putting a hand on a dinner table, grabbing a handle of a cabinet, or the like. This embodiment further increases the flexibility of the method since a same user gesture, e.g. placing a hand on the home furnishing product, may result in different rules for controlling the smart device, depending on where on the furnishing the user places his/hers hand.

The method may further comprise identifying a positioning relationship between the user and the home furnishing product and selecting the set of predetermined user-furniture interaction activities based on the identified positioning relationship.

By the term "positioning relationship" is meant how a user is presently interacting with the furniture. For example, sitting in a sofa; standing in front of a desk. This may reduce the set of predetermined user-furniture interaction activities, which thereby may reduce calculation time and/or computer power.

The identification of a user-furniture interaction activity of a user interacting with a home furnishing product may further comprise analyzing range information, captured by a range sensor, of the scene.

The range information may be depth information captured by a RGBD device, computer vision, a stereovision camera, a ToF sensor, mmWave radar sensor or the like.

The analysis of the range information may comprise detecting a pointing gesture that has a vector pointing towards the smart device to be controlled.

A direction of the pointing gesture may determine which function of the smart device should be obeyed by the pointing gesture, e.g., pointing by an arm to a television should turn on/off the television, or the like.

The method may further comprise acquiring an inventory of home furnishing products in a space, wherein the inventory comprises a position and an orientation of the home furnishing products in the space, and wherein the scene of the user interacting with the home furnishing product is to be taking place in the space.

This may simplify analysis since a specific home furnishing product may be identified once, or at least not every time when in use, for a specific view angle/zoom of the imaging sensor. Hence computer power and/or time may be saved.

The acquiring of the inventory of home furnishing products in the space may comprise capturing range information, captured by a range sensor, of the space, wherein the inventory of home furnishing products in the space comprises position and an orientation of the home furnishing product in a 3D space.

According to a second aspect of the present disclosure, there is provided a non-transitory computer-readable storage medium having stored thereon instructions for implementing the method according to the first aspect, when executed one or more devices having processing capabilities.

The above-mentioned features of the method, when applicable, apply to this second aspect as well. In order to avoid undue repetition, reference is made to the above.

According to a third aspect of the disclosure, there is provided an electronic device comprising:
  an imaging sensor,
  circuitry configured to execute:
    a user-furniture interaction activity identifying function configured to identify a user-furniture interaction activity of a user interacting with a home furnishing product by analyzing sensor data, captured by the imaging sensor, depicting a scene of the user interacting the home furnishing product, a comparing function configured to compare the user-furniture interaction activity against a set of predetermined user-furniture interaction activities, thereby determining a specific predetermined user-furniture interaction activity among the set of predetermined user-furniture interaction activities, wherein each of the predetermined user-furniture interaction activities is associated with a rule of controlling a smart device, and a controlling function configured to control the smart device in accordance with the rule.

The above-mentioned features of the first and second aspect, when applicable, apply to this third aspect as well. In order to avoid undue repetition, reference is made to the above.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present disclosure, will be better understood through the following illustrative and non-limiting detailed description of preferred embodiments, with reference to the appended drawings, where the same reference numerals will be used for similar elements, wherein.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
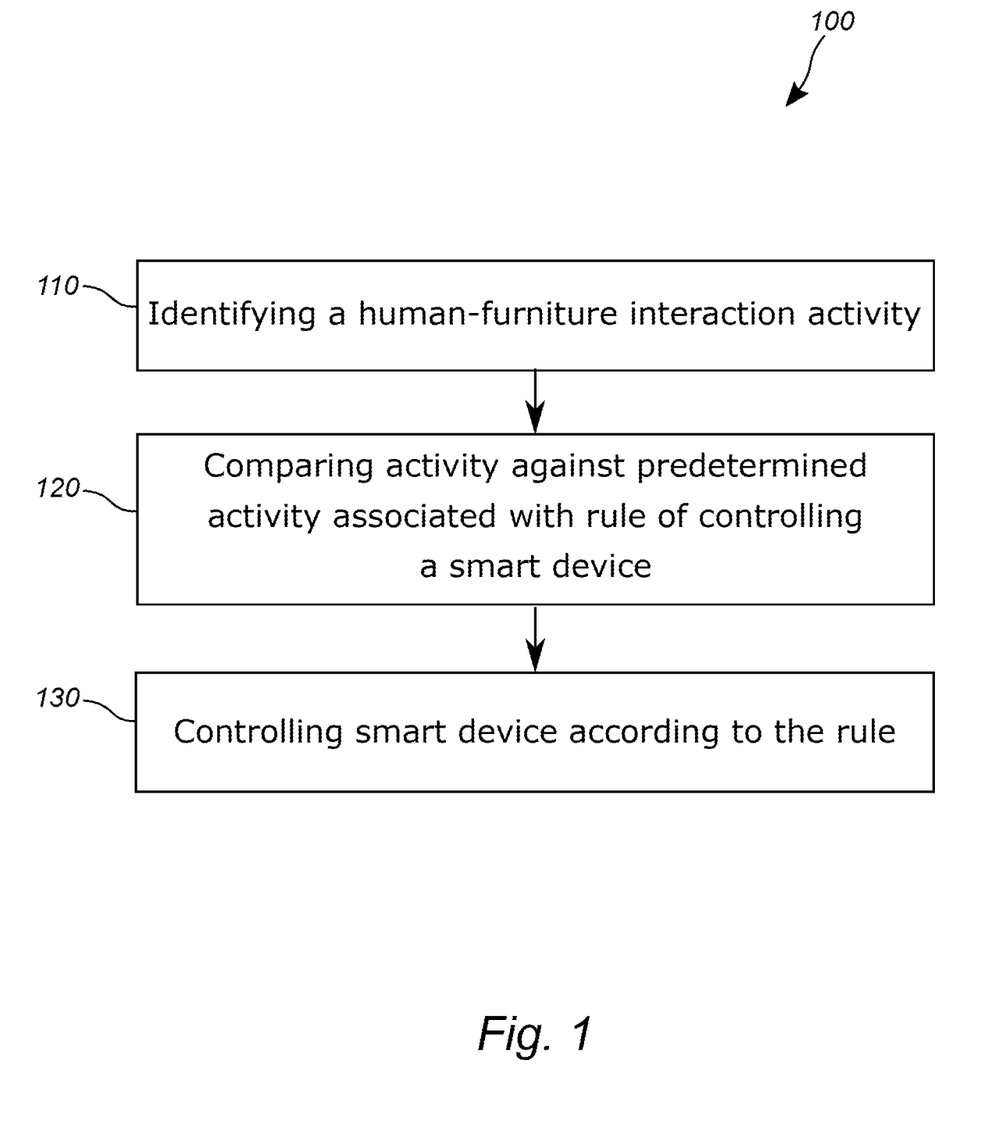
FIG. 1 shows a computer implemented method for controlling a smart device based on a user-furniture interaction activity.

In connection with FIG. 1 there is shown a computer implemented method 100 for controlling a smart device based on a user-furniture interaction activity. The method 100 comprises identifying a user-furniture interaction activity of a user interacting with a home furnishing product by analyzing sensor data captured by an imaging sensor.

Sensor data refers to data captured by the imaging sensor, such as image data, IR-data, radar data, etc. That is, sensor data refers to all kind of data that may be used to give information about a home furnishing product being present in a scene in which a user interacts with the home furnishing product. The imaging sensor may be an ordinary sensor of a video camera. The sensor data may thereby be an image, a set of images, or a video stream of the scene of the user interacting with the home furnishing product. Alternatively, or in combination, the imaging sensor may be based on any 3D-scanning technology, e.g. utilizing a millimeter wave radar (mmWave), time-of-flight, ToF, laser, a light detection and ranging (LIDAR) laser, a conoscopic-holography based method, a phase-shift based method, a triangulation-based method, or the like. The wording "imaging sensor" is further to be understood to possibly include a plurality of imaging sensors, wherein respective imaging sensor of the plurality of imaging sensors may be arranged to capture different types of sensor data, such as RGB data and range data. Possible range information includes capturing three-dimensional, 3D, characteristics of a 3D object or a scene, e.g., a point cloud representing a 3D geometry of the 3D object or the scene. The imaging sensor may be radar-based. Hence, the imaging sensor may be configured to capture sensor data being associated with electromagnetic, EM, waves having wavelengths of approximately 1 mm to 10 cm. The imaging sensor may be a radar based ToF sensor. The imaging sensor may be a millimeter wave radar, mmWave. Such a millimeter wave radar is associated with an EM band ranging approximately between 1 mm to 10 mm.

In one embodiment, a physical structure of the scene is captured by an RGB sensor and a ToF sensor to obtain range information and images for object detection. This example embodiment will form a basis of the following description.

A home furnishing product may be a sofa, a bookcase, a cabinet, a lamp, a curtain, a carpet, a chair, a table, a vase, or the like. Hence, any type of a piece of furniture or furnishing is included in the set of home furnishing products.

The imaging sensor is arranged to depict a scene of the user interacting with the home furnishing product. The scene may be a living room, a bedroom, a kitchen, etc. in a home. In such a scene, the imaging sensor may be located to detect sensor data in the scene, such as visible light or range information. The interaction between the user and the home furnishing product, i.e., the user-furniture interaction activity, may be the user sitting on a sofa in the living room, the user opening a cabinet in the kitchen, the user sitting up in a bed in a bedroom, the user standing in front of/behind a home furnishing product within a threshold distance between the user and the home furnishing product, etc.

The method 100 further comprises comparing 120 the user-furniture interaction activity against a set of predetermined user-furniture interaction activities, thereby determining a specific predetermined user-furniture interaction activity among the set of predetermined user-furniture interaction activities, wherein each of the predetermined user-furniture interaction activities is associated with a rule of controlling a smart device. Determining a specific predetermined user-furniture interaction activity among the set of predetermined user-furniture interaction activities may be done by taking a snapshot with the imaging sensor during a present user-furniture interaction activity. By way of example, the imaging sensor may take a snapshot of the specific predetermined user-furniture interaction activity "sitting in the sofa", whereafter this specific predetermined user-furniture interaction activity is compared to the set of predetermined user-furniture interaction activities. Hence, the comparison may be done between sensor data of previously taken snapshots of user-furniture interaction activities and sensor data of a present user-furniture interaction activity. A match may be determined if the difference between the two-sensor data is below a threshold. Each sensor data of previously taken snapshots may then be associated with a rule of controlling a smart device.

Alternatively, the comparison may be done by detecting a user activity and a home furnishing product to be compared against set of predetermined combinations of user activities and home furnishing products, wherein each predetermined combination may then be associated with a rule of controlling a smart device.

The set of predetermined user-furniture interaction activities is understood being one or more predetermined user-furniture interaction activities. A smart device is generally, and also herein, understood as being an at least partly electronic device, in general connected to other devices or networks via different wireless protocols such as Bluetooth, Zigbee, NFC, Wi-Fi, LiFi, Thread, 5G, etc., that can operate, at least to some extent, interactively and autonomously. Examples of smart devices are a television, a washing machine, a lamp, a light bulb, a stove, a speaker, an air purifier, a connected blind, a smartphone, a tablet, a personal computer, a home alarm system, a refrigerator, etc. Alternatively, a smart device may be any customizable microcontroller comprising a sensor and circuitry having stored thereon predefined or user-written code portions to control or regulating functions associated with the sensor. The rule may be set by the user via a graphical user interface, GUI, or via neuro linguistic programming, NLP. The human-furniture interaction activity may be captured by the imaging sensor to determine skeletal and joint coordinates of the body of the user. These coordinates may be stored in a coordinate system and mapped against a set of coordinates of the scene including the home furnishing product.

Figure 2:
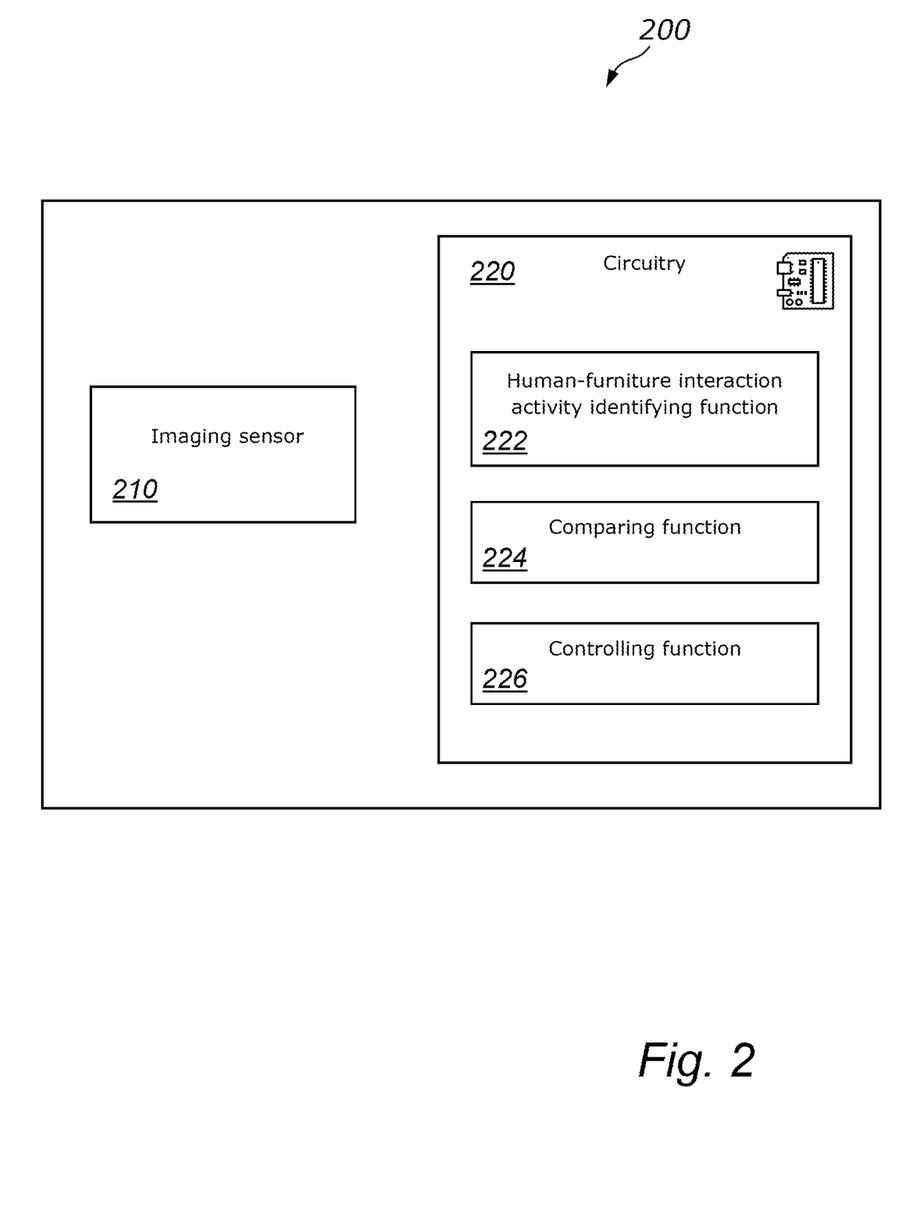
FIG. 2 shows, highly schematically, an electronic device for controlling a smart device based on a user-furniture interaction activity.

The user-furniture interaction activity may thereby be represented by at least a portion of the stored coordinates of the scene including the skeletal and joint coordinates of the user. Preferably, the user-furniture interaction activity may be represented by the stored coordinates of the skeletal and joint coordinates of the user, as detection and storing of the coordinates of the home furnishing product is done prior to determining the skeletal and joint coordinates. A specific user-furniture interaction activity among the set of predetermined user-furniture interaction activities may, via a predetermined metric, be determined by a calculation of a corresponding set of probabilities of the specific user-furniture interaction activity being a respective user-furniture interaction activity among the set of user-furniture interaction activities. If a specific probability among the set of probabilities is high, the specific user-furniture interactivity may be determined as a true specific user-furniture interaction activity. A user interface, UI, associated with the method 100 and an electronic device 200 (further described below) may provide a history of skeletal motions in the scene together with a list of historical matches between a specific user-furniture interaction activity and a predetermined user-furniture interaction activity. Such a history may provide healthy lifestyle suggestions, signs of accidents, or the like.

Still with reference to FIG. 1, the method 100 further comprises controlling 130 the smart device in accordance with the rule. The rule of controlling a smart device may, e.g., be of if-, or while type. For instance, a rule may be: "If the user sits on a sofa, then dim the ceiling lamp", or "While the user is away from the television, pause the movie on the television", etc. Controlling the smart device may be made via instructions from a gateway or a hub.

Below follows a description of optional steps of the method 100.

The method 100 may comprise identifying the user as a specific user. The identification of the user as a specific user may be made by a face recognition, an estimated length or weight of the user, or the like. A trained neural network, an image recognition algorithm, an edge detection algorithm, etc., may be used for such an identification.

The method 100 may comprise selecting the set of predetermined user-furniture interaction activities based on the identified specific user. Hence, the method 100 may allow for personal preferences of rules for controlling the smart device between a plurality of users. The plurality of users may be members of a family. An example may be that a specific user in the family may prefer dimming the ceiling lamp while sitting in the sofa and watching TV, whereas another specific user in the family prefers turning off the ceiling lamp while doing the same. Should there be two or more users in the family having differing preferences, the method may automatically suggest a compromise-based rule for controlling the smart device or that one of the users takes precedence. The method 100 may further comprise machine-learning capabilities thereof, for gradually improving such a compromise-based rule for controlling the smart device. A learning rate of such a compromise-based rules may be accelerated by user feedback provided by relevant users. The method 100 may thereby be arranged to include a permission group, such that a user X takes precedence over a user Y and a user Z, while the user Y takes precedence over the user Z, etc. The skilled person realizes that such a permission group may have any number of users, wherein each user has certain permissions in a corresponding precedence hierarchy. Another alternative is communication between a user and a speaking AI for conflict resolution. For instance, user X prefers switching on the TV and switching of the ceiling lights when sitting down on a sofa, while user Y prefers switching on the TV and maintaining (or switching on, if initially off) the ceiling lights on when sitting down on the sofa. If user Y already sits on the sofa watching TV (and ceiling lights are switched on) while user X sits down on the sofa, the speaking AI may ask whether the users X and Y would like to keep the ceiling light on, or if the ceiling light should be switched off. An agreement between a following human counsel between user X and user Y may henceforth be stored by the method 100 for future use.

The method 100 may comprise identifying the home furnishing product as a specific home furnishing product and selecting the set of predetermined user-furniture interaction activities based on the identified specific home furnishing product. One example of a specific home furnishing product may be a chair. The set of predetermined user-furniture interaction activities may hence be "sitting", "standing behind", etc. Hence, "lying" may be considered a redundant user-furniture interaction activity in association with the presently considered chair, thereby to be excluded from the set of predetermined user-furniture interaction activities in this case.

The identification of the home furnishing product as a specific home furnishing product may comprise comparing characteristics of the home furnishing product against a database of characteristics of home furnishing products. The database may be a library of images. The characteristics may be found by an object detection algorithm, an edge detection algorithm, or the like. The object detection algorithm may comprise image segmentation. The comparison of the characteristics may be performed by a trained neural network, or the like. Depending on the sensor data, visual search algorithms such as provided by Google Lens may be applicable. Alternatively, the identification of the home furnishing product as a specific home furnishing product may comprise reading an optically readable code on the home furnishing product. Such an optically readable code may be a quick response, QR, code or a bar code. Alternatively, the identification of the home furnishing product as a specific home furnishing product may be made by ordinary statistical conclusions performed by the method. For instance, if a plurality of users sit next to each other frequently, the probability may be identified by the method 100 being high that the specific home furnishing product is a sofa, or, if a plurality of users sit such that they form a square-like geometry, the probability may be identified by the method 100 being high that the specific home furnishing product is a dinner table, or the like.

The method 100 may further comprise identifying a functional role of the home furnishing product. A functional role of the home furnishing product may be a verb associated with the user-furniture interaction activity, such as sitting, standing, opening, lying, or the like. For instance, a sofa may be used for sitting. However, a sofa may also be used for lying. Hence, a sofa may be associated with at least two functional roles, i.e., for sitting and for lying. Different home furnishing product may share a similar functional role. For instance, a sofa and a kitchen chair are both associated with the functional role of sitting. However, the type of sitting may vary between a sofa and a kitchen chair. A user generally sits on a sofa in a more relaxed position relative to when the user sits on a kitchen chair, on which a more upright sitting position is common. The method 100 may further comprise distinguishing between variations of a specific functional role.

The method 100 may further comprise selecting the set of predetermined user-furniture interaction activities based on the identified functional role of the home furnishing product. A specific user-furniture interaction activity may be associated with different rules of controlling the smart device if the specific user-furniture interaction activity is identified in connection with home furnishing products having different functional roles. An example may be the following: If the user sits in the sofa, a rule of controlling a smart device may be dimming a ceiling spotlight, whereas if the user sits in an armchair, a different rule of controlling the same smart device may be directing the brightness of the ceiling spotlight to facilitating reading a book, or the like.

The identification of the functional role of the home furnishing product may comprise comparing characteristics of the home furnishing product against a database of characteristics of home furnishing products. The characteristics may be found by an object detection algorithm. The object detection algorithm may comprise image segmentation. The comparison of the characteristics may be performed by a trained neural network, or the like.

The identification of the functional role of the home furnishing product may comprise reading, by the imaging sensor, an optically readable code on the home furnishing product.

The user-furniture interaction activity may comprise a change of position of a body part of the user in relation to the home furnishing product. The change of position of a body part may include an arm resting on an armrest, standing up from a sitting position in a sofa, sitting down from a standing position in front of a kitchen chair, sitting up from laying in a bed, turning the head away from a TV from watching TV, or the like. The user-furniture interaction activity may comprise one or more of a head motion, an arm motion, and a leg motion. A more refined identification of the user-furniture interaction activity may be possible within the present scope. For instance, the method 100 may comprise identifying face gestures such as yawning, closing of eyes, or the like. Hence, if closing of eyes is identified as a user-furniture interaction activity while the user sits/lays in a sofa, the rule of controlling a smart TV may be to turn off the TV. By way of example, identification of closing of eyes may be synonymous to a substantially non-moving user. Hence, sitting or lying in a sofa may include one or more subcategories, e.g., sleeping, detected without identifying face gestures.

The user-furniture interaction activity may comprise an interaction of a specific body part of the user with a specific portion of the home furnishing product. Examples may, yet again, resting an arm or hand on an armrest, putting a hand on a dinner table, grabbing a handle of a cabinet, or the like.

The method 100 may further comprise identifying a positioning relationship between the user and the home furnishing product. A positioning relationship between the user and the home furnishing product is how the user presently interacts with the home furnishing product. This may include standing in front of a kitchen chair, standing behind a desk, pull out the kitchen chair from partly being beneath a dinner table, or the like. The method 100 may further comprise selecting the set of predetermined user-furniture interaction activities based on the identified positioning relationship.

A specific user-furniture interaction activity may imply that a user performs a specific activity within a predetermined threshold distance from a specific home furnishing product, which, in one embodiment, defines the user-furniture interaction activity. Alternatively, a specific user-furniture interaction activity may imply that a user pursues a physical contact with a specific home furnishing product, thereby defining the user-furniture interaction activity. The method 100 may thereby comprise determining whether a user is located within a predetermined threshold distance from a specific home furnishing product and/or the user pursues a physical contact with the specific home furnishing product. If neither of those cases are determined, no further analysis is performed by the method 100.

The identification of the user-furniture interaction activity of the user interacting with a home furnishing product may further comprise analyzing range information, captured by a range sensor, of the scene. The range information is used to generate a range image containing distances to the points in the scene from a reference location. Preferably, the reference location substantially coincides with a location of the range sensor. The range sensor may operate according to the ToF technique. Hence, the range sensor may be a ToF sensor. Alternatively, the range sensor may operate according to one or more of the following techniques: stereo triangulation, sheet of light triangulation, structured light 3D scanning, interferometry, or coded aperture. The range information may be captured by an RGB sensor, an RGBD sensor, a ToF sensor, or the like. Alternatively, the identification of the user-furniture interaction activity of the user interacting with the home furnishing product may further comprise analyzing depth information, captured by a depth sensor, of the scene. The depth sensor may be an ordinary RGB-D sensor for 3D mapping and localization, object recognition, people tracking, etc.

The analysis of the range information may comprise detecting a pointing gesture that has a vector pointing towards the smart device to be controlled. Hence, the user may control a smart device by pointing at it. For instance, the user may point towards the TV to turn it on/off, point towards the ceiling lamp to turn it on/off or to dim it, etc. Further, similar pointing gestures may execute different smart-device functions depending on which type of home furnishing product a user interacts with. For instance, if a user sits on a chair and raises a fist, a lamp brightness may be controlled, while if a user sits on a sofa and raises the fist, a TV volume may be controlled. The method 100 may further distinguish between relatively subtle differences of pointing gestures, e.g., holding up a hand with one, two, or three fingers, where different numbers of fingers or finger combinations is associated with a control of different functions of a certain smart device. The skilled person realizes that this feature can be embodied in many different variants within the scope of the claims. A pointing gesture, as well as the above-mentioned user-furniture interaction activity, may be updated and stored ongoingly while performing the same. For instance, such an update and storing may be done via a speaking/listening AI, e.g., if a user sits on a sofa realizing dimming a TV brightness is a preferable function that should be associated with a rule of controlling the TV, the user may, e.g., while holding up three fingers, say "When holding up three fingers, the TV brightness should be decreased", whereby a corresponding rule may be updated and stored for future use by the method 100.

The method 100 may further comprise acquiring an inventory of home furnishing products in a space, wherein the inventory comprises a position and an orientation of the home furnishing products in the space, and wherein the scene of the user interacting with the home furnishing product is to be taking place in the space. The acquirement of the inventory of home furnishing products in the space may be done periodically, or upon a user request. This may simplify and/or speed up processing time of the method 100, as home furnishing products need not be identified every time a user interacts with a home furnishing product in the scene. The periodic acquirement may, e.g., be on a daily, a weekly, or a monthly basis. The acquirement may occur on a relatively random basis, being occurring sparsely but sufficient. The user request of the acquirement may, e.g., be done after a spatial rearrangement of one or more home furnishing products. The acquiring of the inventory of home furnishing products in the space may comprise capturing range information, captured by a range sensor, of the space, wherein the inventory of home furnishing products in the space comprises position and an orientation of the home furnishing product in 3D space.

In connection with FIG. 2 there is shown a highly schematically drawing of an electronic device 200 comprising an imaging sensor 210, circuitry 220 configured to execute a user-furniture interaction activity identifying function 222 configured to identify a user-furniture interaction activity of a user interacting with a home furnishing product by analyzing sensor data, captured by the imaging sensor, depicting a scene of the user interacting the home furnishing product, a comparing function 224 configured to compare the user-furniture interaction activity against a set of predetermined user-furniture interaction activities, thereby determining a specific predetermined user-furniture interaction activity among the set of predetermined user-furniture interaction activities, wherein each of the predetermined user-furniture interaction activities is associated with a rule of controlling a smart device, and a controlling function 226 configured to control the smart device in accordance with the rule. The above-mentioned features of the method 100, when applicable, apply to the electronic device 200 as well. In order to avoid undue repetition, reference is made to the above. Examples of smart devices are a television, a washing machine, a lamp, a stove, a smartphone, a tablet, a personal computer, a home alarm system, a refrigerator, etc. Alternatively, a smart device may be any customizable microcontroller comprising a sensor and circuitry having stored thereon predefined or user-written code portions to control or regulating functions associated with the sensor. The smart device may communicate with the electronic device 200 by any adequate transmission technique, e.g., by Wi-Fi, Bluetooth, Bluetooth low energy, Zigbee, Thread, 5G, via a gateway, or the like. Alternatively, the communication may occur via a wired connection, such as an electrical conductor, a coaxial cable, fiber optic cable, etc. The electronic device 200 may comprise a first sensor for capturing one or more digital images of a scene, the one or more digital images possibly constituting a video stream. The electronic device 200 may comprise a second sensor for capturing range information of the scene for determining a physical structure of the scene. Alternatively, the first sensor may be arranged to capture range information, e.g., to capture a point cloud. Hence, the first sensor may by way of example be an RGB-D sensor associated with an ordinary RGB camera and an IR camera, thereby being capable of capturing both RGB data and range data. In one embodiment, the first sensor is an ordinary RGB sensor for capturing RGB data, and the second sensor is a ToF sensor for capturing range data.

Figure 3:
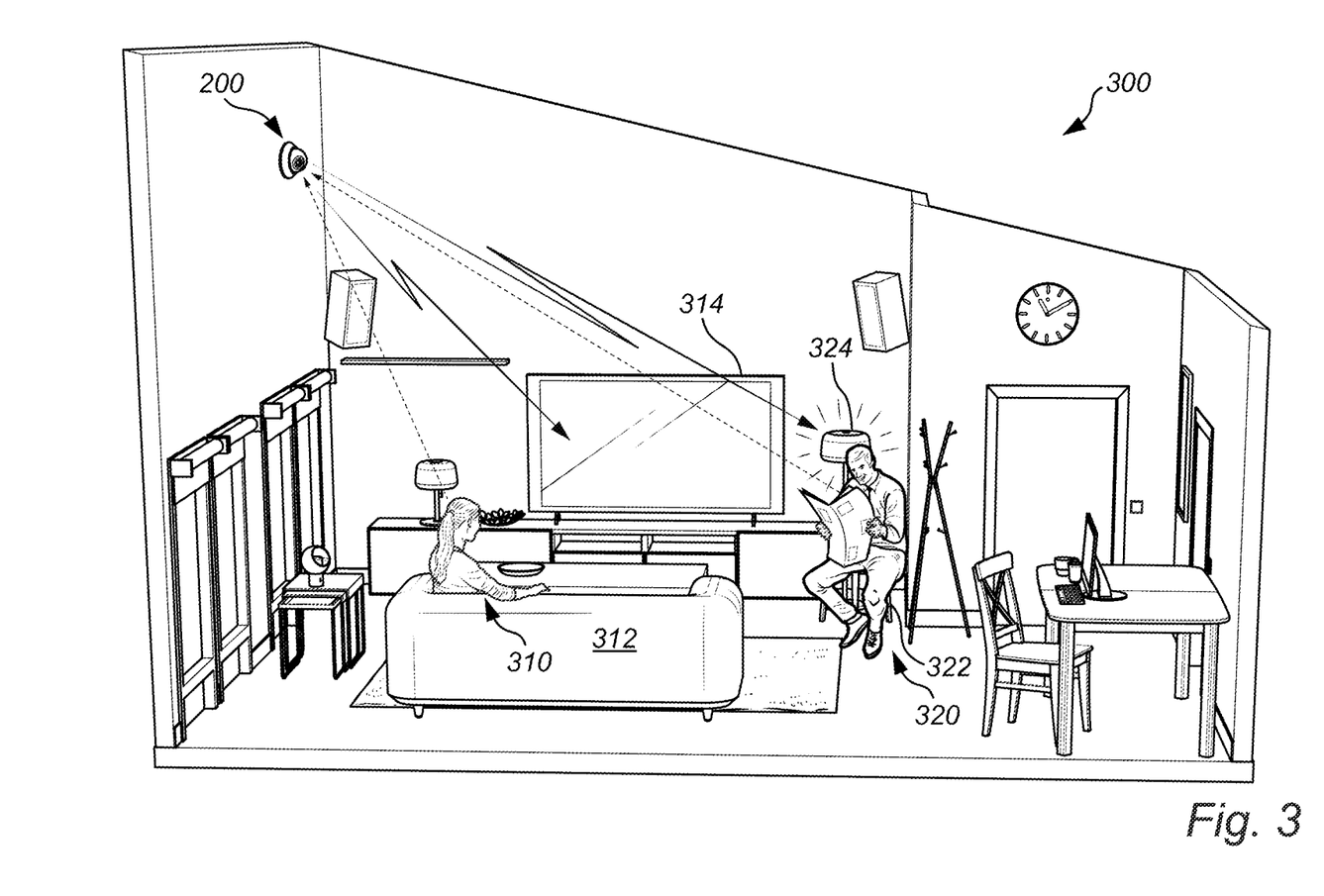
FIG. 3 shows a scene exemplifying a user-furniture interaction activity and the control of a smart device thereof.

In connection with FIG. 3 it is demonstrated a straightforward example use case of the method 100 and the electronic device 200. A scene 300 is shown, illustrating a living room of a home, including the following, for this example, relevant home furnishing products: a sofa 312, a television 314, a stool 322 and a floor lamp 324. When a first person 310 sits down on the sofa 312, the method 100, implemented in the electronic device 200, thereby identifies a user-furniture interaction activity as the first person 310 sitting down on the sofa 312. Next, the method 100 compares the user-furniture interaction activity against a set of predetermined user-furniture interaction activities, wherein each such predetermined user-furniture interaction activity is associated with a rule of controlling a smart device. Herein, the smart device is the television 314, and the rule is to turn on the television. Hence, when the first person 310 sits down on the sofa 312, the television 314 is turned on. The method 100, and thereby the electronic device 200, cooperate similarly for the second person 320 sitting down on a stool 322. In this situation the following happens: When the second person 320 sits down on the stool 322, the floor lamp 324 is turned on.

Other features and embodiments of the electronic device may be applicable to the above-mentioned specification of the method 100.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims.

What is claimed is:

1. A computer implemented method for controlling a smart device, the method comprising:
   identifying a user-furniture interaction activity of a user interacting with a home furnishing product by analyzing sensor data, captured by an imaging sensor, depicting a scene of the user interacting with the home furnishing product;
   identifying the home furnishing product as a specific home furnishing product and/or a functional role of the home furnishing product by at least one of: comparing characteristics of the home furnishing product determined from the sensor data against a database of characteristics of home furnishing products, and reading an optically readable code on the home furnishing product;

selecting a set of predetermined user-furniture interaction activities based on the identified specific home furnishing product and/or identified functional role of the home furnishing product;

comparing the user-furniture interaction activity against the set of predetermined user-furniture interaction activities, thereby determining a specific predetermined user-furniture interaction activity among the set of predetermined user-furniture interaction activities, wherein each of the predetermined user-furniture interaction activities is associated with a rule of controlling a smart device; and controlling the smart device in accordance with the rule.

2. The method according to claim 1, further comprising: identifying the user as a specific user; and
wherein selecting the set of predetermined user-furniture interaction activities is further based on the identified specific user.

3. The method according to claim 1, wherein the user-furniture interaction activity comprises a change of position of a body part of the user in relation to the home furnishing product.

4. The method according to claim 3, wherein the user-furniture interaction activity comprises one or more of a head motion, an arm motion, and a leg motion.

5. The method according to claim 1, wherein a user-furniture interaction activity comprises an interaction of a specific body part of the user with a specific portion of the home furnishing product.

6. The method according to claim 1, further comprising: identifying a positioning relationship between the user and the home furnishing product, and
wherein selecting the set of predetermined user-furniture interaction activities is further based on the identified positioning relationship.

7. The method according to claim 1, wherein the identification of a user-furniture interaction activity of a user interacting with a home furnishing product further comprises:
analyzing range information, captured by a range sensor, of the scene.

8. The method according to claim 7, wherein analyzing the range information comprises detecting a pointing gesture that has a vector pointing towards the smart device to be controlled.

9. The method according to claim 1, further comprising: acquiring an inventory of home furnishing products in a space, wherein the inventory comprises a position and an orientation of the home furnishing products in the space, and wherein the scene of the user interacting with the home furnishing product is to be taking place in the space.

10. A non-transitory computer-readable storage medium storing instructions, which when executed by one or more devices having processing capabilities, cause the one or more devices to:

identify a user-furniture interaction activity of a user interacting with a home furnishing product by analyzing sensor data, captured by an imaging sensor, depicting a scene of the user interacting with the home furnishing product;

identify the home furnishing product as a specific home furnishing product and/or a functional role of the home furnishing product by at least one of: comparing characteristics of the home furnishing product determined from the sensor data against a database of characteristics of home furnishing products, and reading an optically readable code on the home furnishing product;

select a set of predetermined user-furniture interaction activities based on the identified specific home furnishing product and/or identified functional role of the home furnishing product;

compare the user-furniture interaction activity against the set of predetermined user-furniture interaction activities, thereby determining a specific predetermined user-furniture interaction activity among the set of predetermined user-furniture interaction activities, wherein each of the predetermined user-furniture interaction activities is associated with a rule of controlling a smart device; and control the smart device in accordance with the rule.

11. An electronic device for controlling a smart device, the electronic device comprising:
an imaging sensor; and
circuitry configured to execute:
a user-furniture interaction activity identifying function configured to:
identify a user-furniture interaction activity of a user interacting with a home furnishing product by analyzing sensor data, captured by the imaging sensor, depicting a scene of the user interacting the home furnishing product; and
identify the home furnishing product as a specific home furnishing product and/or a functional role of the home furnishing product by at least one of: comparing characteristics of the home furnishing product determined from the sensor data against a database of characteristics of home furnishing products, and reading an optically readable code on the home furnishing product;
a comparing function configured to:
select a set of predetermined user-furniture interaction activities based on the identified specific home furnishing product and/or identified functional role of the home furnishing product; and
compare the user-furniture interaction activity against the set of predetermined user-furniture interaction activities, thereby determining a specific predetermined user-furniture interaction activity among the set of predetermined user-furniture interaction activities, wherein each of the predetermined user-furniture interaction activities is associated with a rule of controlling a smart device; and
a controlling function configured to control the smart device in accordance with the rule.

* * * * *